United States Patent
Welling, Jr. et al.

(10) Patent No.: US 6,181,927 B1
(45) Date of Patent: Jan. 30, 2001

(54) SPONSORED CALL AND CELL SERVICE

(75) Inventors: James Brian Welling, Jr., Dallas; Sima Chiniwala, Plano; Stewart Hodde Maxwell, Dallas; Thanh Pham; Anatoly Vaserfirer, both of Plano, all of TX (US)

(73) Assignee: Nortel Networks Corporation, Montreal (CA)

(*) Notice: Under 35 U.S.C. 154(b), the term of this patent shall be extended for 0 days.

(21) Appl. No.: 09/024,985

(22) Filed: Feb. 17, 1998

Related U.S. Application Data

(60) Provisional application No. 60/038,067, filed on Feb. 18, 1997.

(51) Int. Cl.⁷ .................................................. H04M 3/42
(52) U.S. Cl. .................... 455/414; 455/412; 455/405; 455/461; 379/67; 379/89; 379/201
(58) Field of Search ............................ 455/403, 405–408, 455/412, 414–415, 417, 422, 445, 461, 550; 379/67, 88–89, 201, 114, 111, 83

(56) References Cited

U.S. PATENT DOCUMENTS

| | | |
|---|---|---|
| 5,333,186 | 7/1994 | Gupta . |
| 5,448,625 | 9/1995 | Lederman . |
| 5,539,809 | 7/1996 | Mayer et al. . |
| 5,852,775 | * 12/1998 | Hidary ................................. 455/412 |
| 5,937,037 | * 10/1999 | Kamel et al. ...................... 379/88.22 |
| 6,009,150 | * 12/1999 | Kamel ............................... 379/88.23 |

FOREIGN PATENT DOCUMENTS

| | | |
|---|---|---|
| 2206265 | 12/1988 | (GB) . |
| 91/06187 | 5/1991 | (WO) . |

* cited by examiner

*Primary Examiner*—Doris H. To
(74) *Attorney, Agent, or Firm*—Carr & Storm, L.L.P.

(57) ABSTRACT

In a telecommunications system, a subscriber station invokes a sponsored-call application service program when the subscriber station originates a call. Based upon certain criteria, service logic determines whether the call is sponsored or not. If sponsored, additional service logic utilizes the location of the call origination (i.e., location of the subscriber station) and/or other attributes of the subscriber station to select an announcement from a plurality of announcements for transmission to the subscriber station. After the announcement is transmitted (i.e., played), the subscriber station is connected to the call's desired destination. If not sponsored, the call is handled as a normal call.

19 Claims, 4 Drawing Sheets

SPONSORED CALL AND CELL SERVICE

This application claims priority from U.S. Provisional Patent Application No. 60/038,067 filed Feb. 18, 1997.

TECHNICAL FIELD OF THE INVENTION

The present invention relates in general to cellular communications systems and, in particular, to an apparatus and method for communicating messages to a subscriber station in response to one or more attributes relating to the subscriber station.

BACKGROUND

The current costs for subscribing to a telecommunications system, including wireless mobile telecommunications systems, are prohibitive for some persons. These costs are directly attributable to the complexity of such telecommunication systems and the large capital outlay needed for the design and development of infrastructure for the systems. The significant costs that must be charged to subscribers for utilization of these telecommunications and to maintain (and recoup investment in) such systems prevents some persons from utilizing the systems. If the cost of services were reduced, more persons would subscribe to such services.

Accordingly, there exists a need for a method and apparatus that will increase the number of users in a telecommunications system by reducing the cost of calls made by the user(s). Also, there is needed a method and apparatus that provides the capability of transmitting messages to a subscriber station in a telecommunications system based on the location of the subscriber station and/or other attributes or characteristics of the subscriber station.

SUMMARY OF THE INVENTION

According to the present invention, there is provided an apparatus and method for selecting and transmitting a message to a user in a telecommunications system. The apparatus (and method) performs the steps of receiving a call from a subscriber station, the call comprising call origination information; comparing the call origination information to triggering criteria and triggering if the call origination information meets the triggering criteria; selecting a message based on one or more attributes of the subscriber station in response to the triggering; and transmitting the selected message to be received by the subscriber station.

In another aspect of the present invention, there is provided a method for selecting and transmitting a message to a user in a telecommunications system. The method includes the steps of receiving a call from a subscriber station, receiving location data identifying the location of the subscriber station, selecting a message in response to the location data, and transmitting the selected message to be received by the subscriber station.

In yet another aspect of the present invention, there is provided an apparatus for selecting and playing an announcement to a user in a telecommunications system. The apparatus includes a base station that receives a call from a subscriber station. A service control processor receives location data identifying the location of the subscriber station and selects one of the plurality of announcements from a database having a plurality of announcements, in response to the location data. The selected announcement is then played or transmitted to the subscriber station.

BRIEF DESCRIPTION OF THE DRAWINGS

For a more complete understanding of the present invention, and the advantages thereof, reference is made to the following description taken in conjunction with the accompanying drawings, wherein.

DETAILED DESCRIPTION OF THE INVENTION

Figure 1:
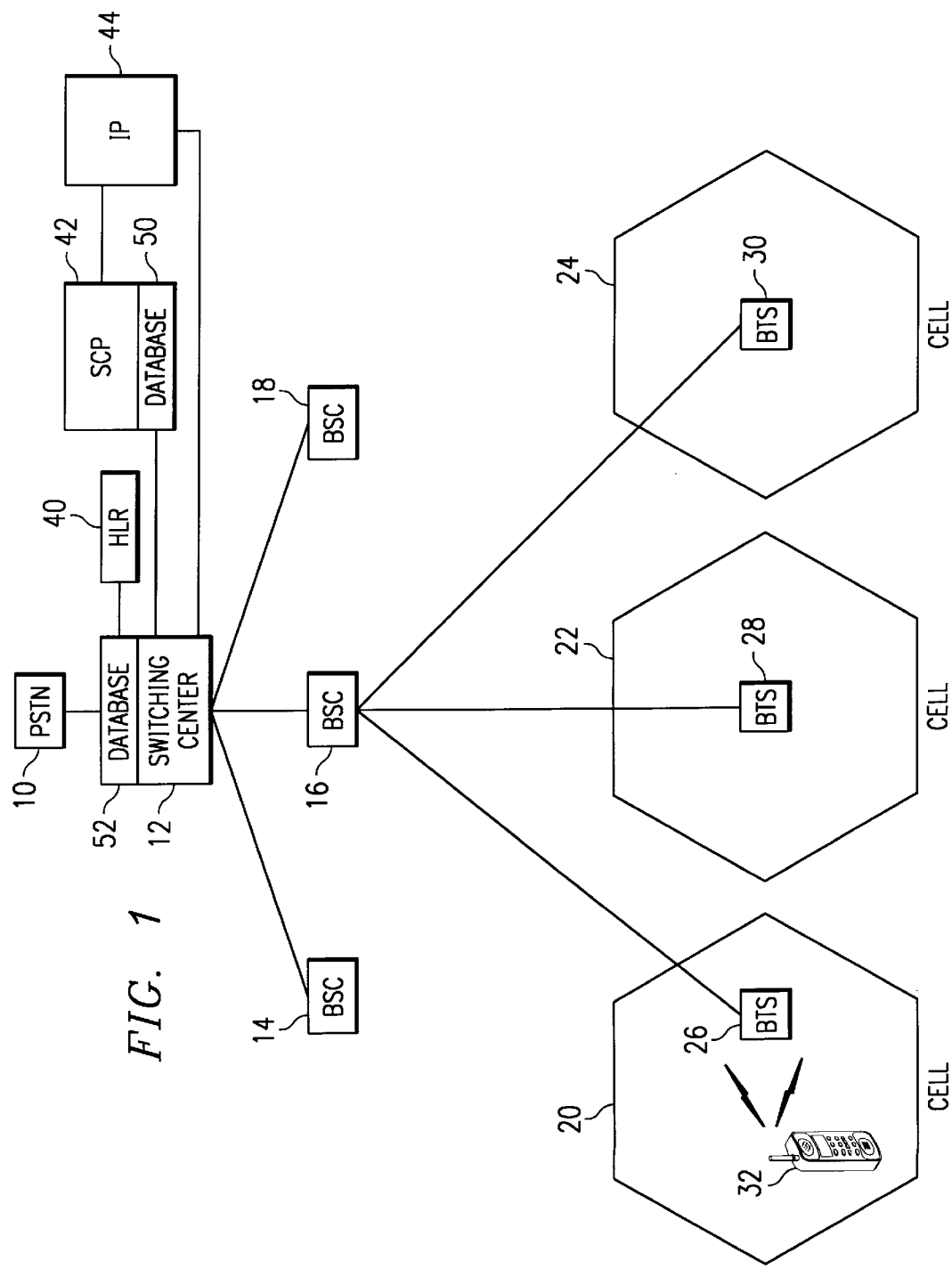
FIG. 1 is a block diagram illustrating a standard cellular telecommunications system.

With reference to the drawings, like reference characters designate like or similar parts throughout the drawings.

Now referring to FIG. 1, there is shown a block diagram of a standard cellular system. A switching center (SC) 12 is connected to a public switched telephone network (PSTN) 10. Connected to the switching center 12 as shown are three base station controllers (BSC) 14, 16 and 18. In a standard system, each BSC 14, 16, 18 is connected to one or more base stations (BTS). As shown in FIG. 1, the BSC 16 is connected to a BTS 26, a BTS 28 and a BTS 30 with each BTS operable within a cell designated by reference numerals 20, 22, and 24, respectively. Similarly, the other BSCs 14 and 18 may be connected to one or more BTSs within a cell (not shown). The BTS cell blocks are shown in hexagonal format which is the industry standard representation of a cell within which a subscriber station may reliably receive communications from that particular BTS. Within the cell 20 is shown a subscriber station 32 able to use the cellular network via the BTS 26 for the cell 20. These subscriber stations may be mobile and therefore may leave the cell 20 and enter another cell in the cellular system.

The cellular system also includes a home locator register (HLR) 40 that is connected to the switching center 12. A service control point (SCP) 42 is also provided and connected to the switching center 12 while an intelligent peripheral (IP) 44 is connected to the SCP 42 and to the switching center 12.

The HLR 40 is a database that stores data specific to each subscriber station that may utilize the cellular system. This data includes supplementary service, IN service and location data, identification information and triggering information. Upon call origination from a subscriber station 32, the switching center 12 receives an identification number from the subscriber station 32. The identification number uniquely identifies the subscriber station 32. The identification information is transmitted to the HLR 40. The HLR 40 then transmits a copy of all relevant data concerning the subscriber station 32 (including service and triggering information) to the switching center 12 in order for the switching center 12 to process the call (this copied data is normally stored in a visitor locator register (VLR) within the switching center 12 if the switching center 12 is a mobile switching center).

The SCP 42 is an intelligent node that executes service logic when required based on certain criteria involved in the call origination. The SCP 42 generally includes a computer system (not shown) for processing. Some calls are basic calls that are routed (i.e. connected) through the switching center 12 to a destination, while other calls cause initiation of a service application program depending on certain characteristics of the call (e.g., 1-800 calling, debit card calling, etc.). The SCP 42 receives service requests from the switching center 12. These requests initiate one or more service application programs (service logic) that control processing of the call.

The IP 44 is an intelligent network node that provides special resource functions to the system. These functions include transmitting or playing announcements to the subscriber station, collecting responses from the subscriber station and forwarding them to the SCP 42, etc. The IP 44 generally includes a computer system (not shown) for providing these functions and communicates with the switching center 12 and the SCP 42.

Depicted in FIG. 1 is the standard cellular telecommunications system. As will be appreciated, the present invention is also applicable to non-wireless telecommunications systems. It will be understood that in a non-wireless system, the subscriber station 32 would communicate with the switching center 12 via wire lines and local exchanges whereby the switching center 12 is identified as a service switching point (SSP). In the wireless system, the switching center 12 is sometimes referred to as the mobile switching center (MSC).

Figure 2A:
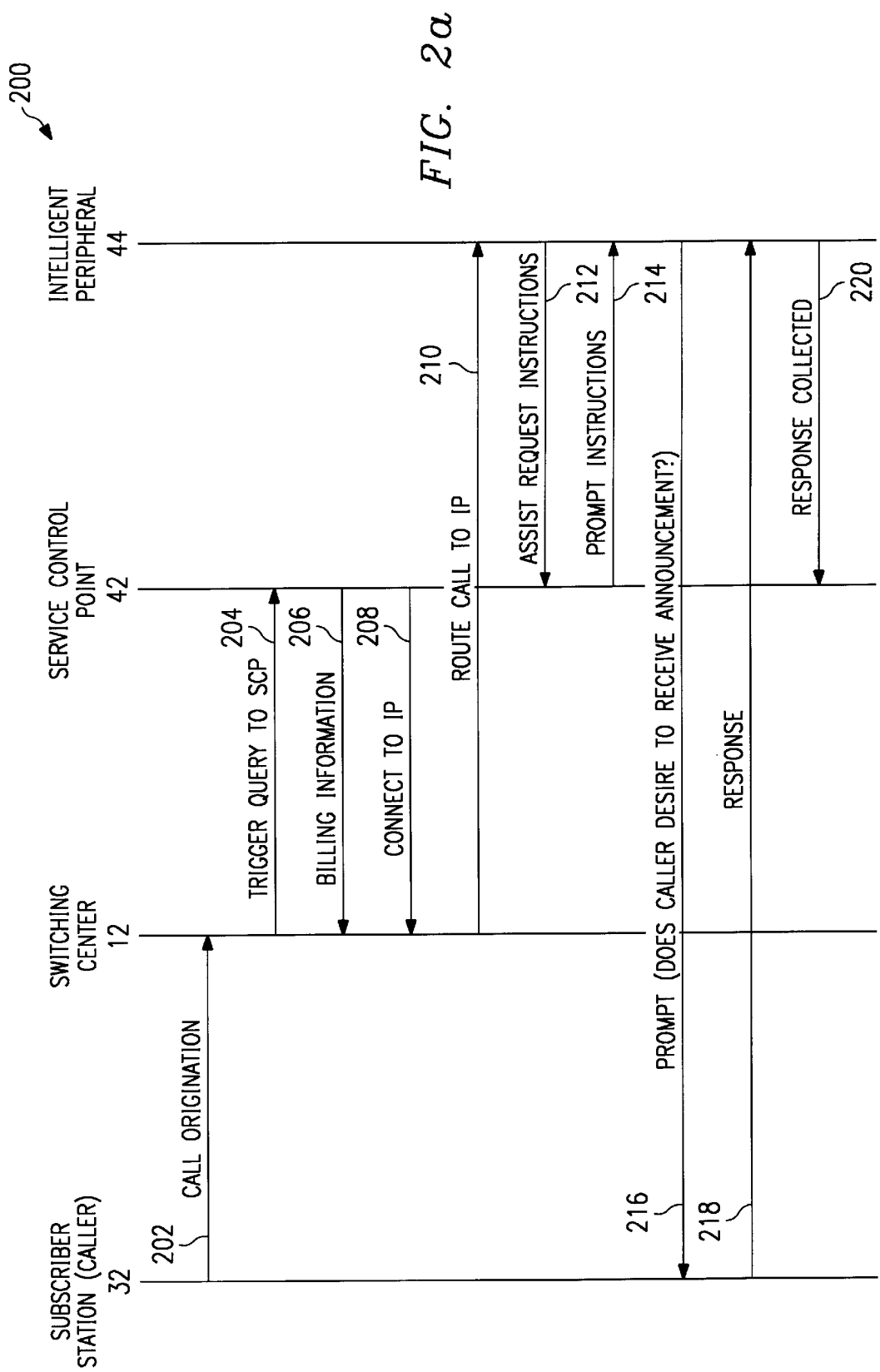
FIGS. 2a–2b are flow diagrams illustrating a method in accordance with the present invention.
Figure 2B:
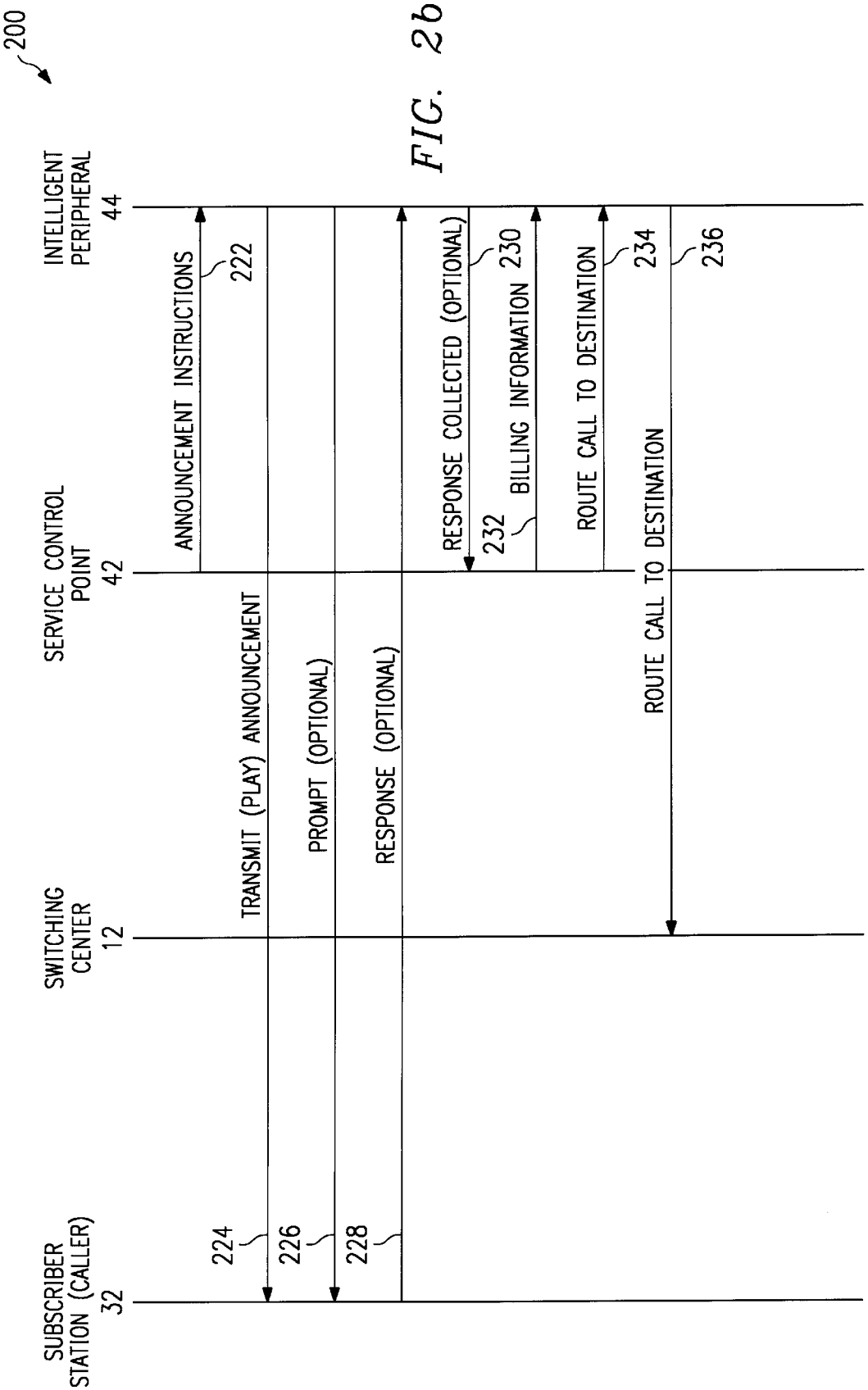

Now referring to FIGS. 2a–2b, there is depicted a method 200 of the present invention (i.e. call flow). The subscriber station 32 establishes a communications link with the BTS 26 and originates a call—referred to as call origination, identified in FIG. 2a by a reference numeral 202. The call origination includes call origination information that typically includes called party identification (or number), station identification data that uniquely identifies the subscriber station (sometimes referred to as the MSISDN—for wireless), and any other desired origination information. It will be understood by persons skilled in the art that the call origination information generally includes certain pre-defined data consistent with one or more telecommunications standards (as desired).

The switching center 12 receives the call origination (and information) from the subscriber station 32 via the BTS 26 and the BSC 16. By communicating through the BTS 26 (and/or BSC 16) to the switching center 12, the location of the subscriber station is known. As shown in FIG. 1, the location of the subscriber station is in the cell 20. Further location information may be obtained by sectorization of the cell 20 or by any other methods or means known to those skilled in the art, or developed in the future, for determining location of the subscriber station 32. Accordingly, the switching center 12 possesses information (such as BTS identification data, etc.) useful for identifying the location of the subscriber station 32. Similarly, in a non-wireless-system, the switching center 12 will also possess location information of a subscriber station (determined from the normal wire channels and devices used for communications between the subscriber station and the switching center).

Call origination information is used to "trigger" execution of a service application program (or service logic) by the SCP 42. The service application program controls processing of the call in accordance with the functionality of the service application program. The present invention includes a service application program which, when invoked, selects a message to be transmitted and played to the subscriber station. The message is selected based on subscriber station attributes or characteristics.

A subscriber station attribute is any personal or public information relating to the owner or user of the subscriber station, or information relating to the subscriber station itself. Such personal or public information may include age, sex, race, religion, family history, income, or the like, or any other information about the owner or user (i.e. profile information). Subscriber station attributes also include information relating to the subscriber station itself such as time of the call, day of week of call, origination location of the call, location of the subscriber station, and the like, or any other information about the subscriber station or the originated call. As used herein, the term subscriber station refers to the caller or station user (mobile or stationary), or the actual hardware unit used by the caller or station user for communicating.

Triggering is initiated based on the presence (or absence) of particular data contained in the call origination information. In the present invention, triggering the execution of the service application program may occur in one of two ways. Preferably, the trigger is based on the subscriber station ID (MSISDN). The subscriber station ID is compared to a list of station IDs contained in a database 50. If the subscriber station ID of the subscriber station 32 equals (meets or matches) one of the station IDs in the database 50, the service application program is triggered and the SCP 42 processes the call in accordance with the functionality of the service application program. The database 50 is shown internal to the SCP 42 (see FIG. 1), but it may also be provisioned external to the SCP 42, or within another node or device within the telecommunications system, such as the switching center 12. In this method of triggering, the call origination is forwarded by the switching center 12 to the SCP 42, as identified by a reference numeral 204. The SCP 42 performs the comparison and triggering function. Alternatively, the switching center 12 performs the triggering utilizing triggering information from the HLR 40.

In another way, the trigger is a unique number called by the subscriber station 32. The called number is compared to a list of special numbers in a trigger database 52. If the called number matches the one of the triggers, the service application program is triggered and the SCP 42 processes the call in accordance with the functionality of the service program. The trigger database 52 is shown internal to the switching center 12, but it may also be provisioned external to the switching center 12, or within another node or device in the telecommunications system. The switching center 12 performs the comparison and triggering function and transmits a request for the SCP 42 to execute the sponsored-call service application program for call control processing (this method of triggering is not shown by a reference numeral). As will be appreciated, other triggering criteria may be utilized if so desired.

Upon execution, the sponsored-call service application program processes one or more attributes of the subscriber station 32 and selects a message (e.g., announcement) to be transmitted (e.g., played) to the subscriber station 32. The message is selected from a number of messages. The process of selecting which message or announcement for transmission to the subscriber station 32 is described in more detail in FIGS. 3a–3b and the corresponding description.

Billing information for the call is transmitted from the SCP 42 to the switching center 12 with sufficient information to indicate the call was sponsored (or not sponsored) and the identity of the party (or parties) to be billed and at what rate or amount. This step is indicated by a reference numeral 206.

The SCP 42 transmits a connect request to the switching center 12 requesting connection of the subscriber station 32 to the IP 44, as identified by a reference numeral 208. The connect request generally includes an SCP ID, a correlation ID and an IP ID (corresponding to the IP 44). The switching center 12 then connects the subscriber station 32 to the IP 44, as identified by the reference numeral 210. The called party ID for this connection generally includes the IP ID, the SCP ID, and a correlation ID.

After the subscriber station 32 is connected (i.e., a communications link is established) to the IP 44, the IP 44 notifies the SCP 42 that the connection is established and requests further instructions (as identified by reference numeral 212).

The SCP 42 instructs the IP to provide an override prompt to the subscriber station 32 (reference numeral 214). The override prompt (reference numeral 216) is in the form of an audible announcement that requests a response from the subscriber station 32 if the user desires to receive the selected message (see above) and continue with the call in accordance with functionality of the sponsored-call service. An example of the override announcement may be "This call is being sponsored. If you do not wish to listen, please press the '#' key now to abort the service." The desired response from the subscriber station 32 is usually the transmission of a tone to the IP 44. This tone is generated when the user of the subscriber station pushes the appropriate user key in response to the prompt announcement. The response of the subscriber station 32 is received by the IP 44 (as identified by reference numeral 218) and forwarded to the SCP 42 for validation (as identified by reference numeral 220). If the appropriate (valid) response received is consistent with the subscriber station's desire to continue in accordance with the sponsored-call process, the process continues. If not, the SCP requests that the switching center 12 route the call as a normal call to the appropriate destination (e.g. called party address). As will be appreciated, the override prompt and its functionality may be optional.

The override process gives the subscriber station 32 the option to abort the sponsored-call process by pressing a specified key. If this option is chosen, the call is connected to the desired destination (called party address) and the call is not considered sponsored. Thereafter, the call is handled as a normal call.

Assuming the response to the prompt is valid (or the override prompt function is not used), the SCP 42 transmits message instructions to the IP 44 instructing the IP 44 to play the message (announcement) previously selected by the SCP 42 (as identified by reference numeral 222). The instructions generally include an announcement ID corresponding to one of a plurality of messages stored in the IP 44 (or stored in a database accessible by the IP 44), and includes any other data that may be necessary to instruct the IP 44 to transmit the selected message to the subscriber station 32. Thereafter, the IP 44 transmits (or plays) the selected message to the subscriber station 32 (as identified by reference numeral 224). The contents of the selected message include any message or announcement as desired. As will be appreciated, the selected message may include more than one discrete or separate message.

Optionally, the IP 44 also transmits a prompt message to the subscriber station 32 after the selected message is played (as identified by reference numeral 226). This prompt message is appended to the end of the selected message, included as part of the selected message, or transmitted as a message separate from the selected message. The contents of the prompt message may include any contents as desired. For example, the prompt message may be used to verify that the user of the subscriber station actually listened to the selected message, or used to prompt the user to do some other action or provide one of several possible responses. An example of a prompt message is "Please press 3 now for 2 minutes of free calling or press 1 to repeat this announcement." By pressing "1", the subscriber station has the option of requesting a replay of the announcement.

The desired response from the subscriber station 32 is usually the transmission of a tone to the IP 44. This tone is generated when the user of the subscriber station 32 pushes a user key in response to the prompt announcement. The response of the subscriber station 32 is received by the IP 44 (as identified by reference numeral 228) and forwarded to the SCP 42 for validation (as identified by reference numeral 230). If an appropriate (valid) response received is consistent with the subscriber station's desire to continue in accordance with the sponsored-call process, the process continues. If not (e.g., announcement has already been repeated once, an invalid response, or a time-out), the SCP 42 requests that the switching center 12 route the call as a normal call to the appropriate destination (e.g. called party address) (not shown).

Additionally, the present invention may provide for the announcements to be interruptible. If so, the subscriber station may interrupt or abort the announcement at anytime by pressing a specified key. If interrupted or aborted, the call is not considered sponsored, and the call is handled as normal call.

If the foregoing optional prompt process is used and the call is deemed a "sponsored" call, or the optional prompt process is not used and the announcement has been played, the SCP 42 provides instructions to the IP 44 for routing the call to the appropriate destination (reference numeral 234). The IP 44 transmits routing instructions to the switching center 12 (as identified by reference numeral 236) which performs the actual switching function and routes the call to the destination. Additionally, the SCP 42 transmits billing information to the IP 44 (as identified by reference numeral 232) and this billing information is also provided to the SCP 42 for operational and billing purposes.

As will be appreciated, the steps, actions and functions illustrated in FIGS. 2a–2b are not necessarily shown in chronological order and some may be performed concurrently with others.

Optionally, calls to specific destinations can be deemed ineligible for call sponsorship and may be identified in advance by the caller (one who is a member of this sponsored-call service), the sponsors, or the service provider. Additionally, a language preference indicator associated with the subscriber station's profile information may be used to select the appropriate language for the selected announcement.

For all calls that are deemed "sponsored", the sponsored-call application service program provides sufficient billing information to the downstream billing systems to determine whether or not the call is sponsored and apply the appropriate rebate, cost reduction, billing calculations, etc.

Describing the method 200 in general terms, a subscriber station invokes the sponsored-call application service when the subscriber station originates a call. Based on certain criteria, service logic determines whether the call is sponsored or not. If so, additional service logic selects an announcement to be played to the subscriber station from a plurality of announcements. After the announcement is played, the subscriber station is connected to the call's desired destination. If it is not sponsored, the call is handled as a normal call.

Figure 3A:
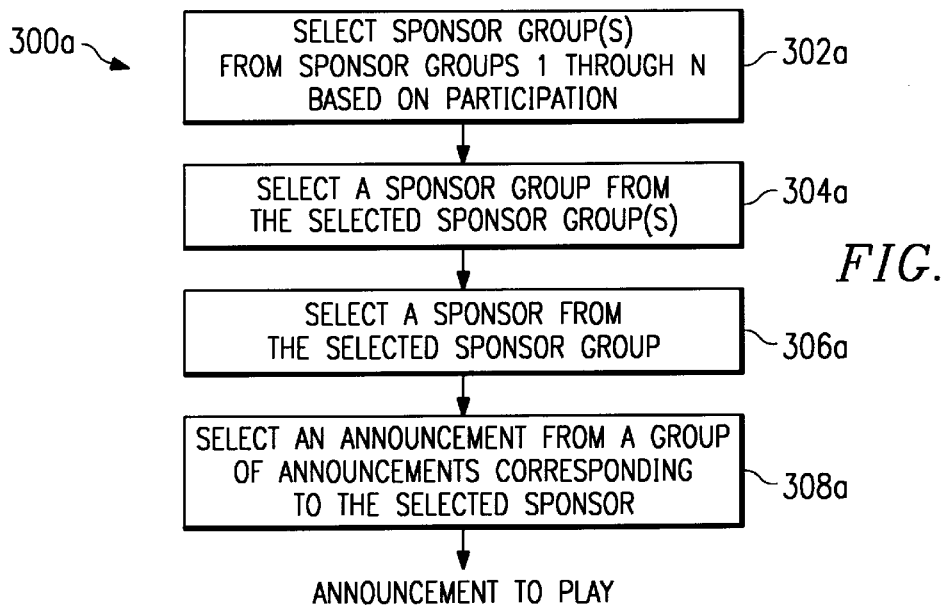
FIGS. 3a–3b are flow diagrams illustrating selection processes for selecting an announcement from a group of announcements based on one or more attributes of a subscriber station.
Figure 3B:
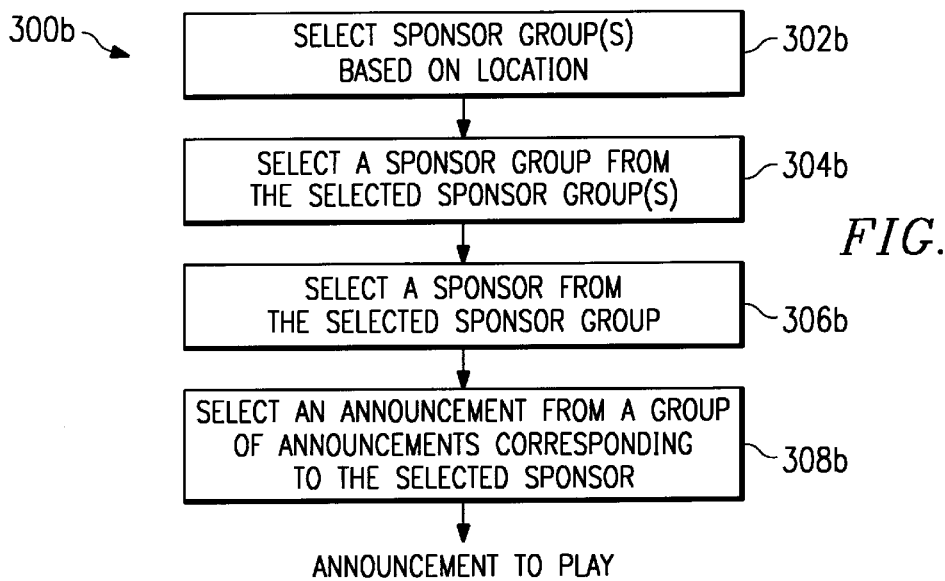

Now referring to FIGS. 3a–3b, there are illustrated two processes 300a, 300b for selecting an announcement (or message) from a group of one or more announcements (or messages). The selection processes 300a, 300b utilize one or more attributes of the subscriber station 32 to assist in selecting or identifying an announcement for transmission (i.e., played) to the subscriber station 32.

Now referring to FIG. 3a, there is illustrated a selection process 300a of the present invention. The process 300a selects one or more sponsor groups from a set of predetermined sponsor groups 1 through N, at a step 302a. The selection of the sponsor group(s) is based upon participation by the subscriber station 32 which results in a corresponding group of sponsor(s) being selected from the groups 1 thru N. For example. if there exist ten predefined sponsor groups 1 through 10, then the subscriber station 32 may "belong" to four of these groups. If so, then the four groups are selected from the groups 1 through N at the step 302a.

Any number of sponsor groups N may be organized and created. The sponsors in each group may be included in that particular group based upon the type of sponsor involved, the particular goods or services that the sponsor is advertising, or some random grouping.

When a call from the subscriber station is received by the SCP 42, the caller's profile is retrieved using the MSISDN of the caller. Based upon the retrieved profile, one or more sponsor groups are selected from the group of sponsor groups 1 through N. This profile generally includes attributes of the subscriber station 32, such as personal or public information including age, sex, race, religion, family history, income, or the like, or any other information about the owner or user (i.e. profile information). Also, the groups may be selected based upon some predefined groups associated with the caller.

After one or more sponsor groups are selected from the groups 1 thru N. at a step 304a, a single sponsor group is selected from these groups (if only one group sponsor group has been selected in step 302a, then step 304a is bypassed). The selection in step 304a may also include profile information, as desired, or may simply occur by a random selection of one of the sponsor groups selected in step 302a.

In a step 306a, a sponsor is selected from the sponsors contained within the sponsor group selected in step 304a. The sponsor is selected based upon the time of day the call originated, or the day of the week on which the call originated. In addition, the sponsor may also be selected based upon random selection or a weighted selection, or some combination of the foregoing.

At a step 308a, a particular announcement is selected from a set of announcements that are associated with the particular sponsor selected in the step 306a. The selection process in the step 308a follows a similar process as in step 306a. The announcement is selected based upon the time of day the call originated, or the day of the week on which the call originated. Likewise, the announcement may also be selected based upon random selection or a weighted selection, or some combination of the foregoing.

Now referring to FIG. 3b, there is illustrated a selection process 300b of the present invention. The process 300b selects one or more sponsor groups from a set of predetermined sponsor groups 1 through N, at a step 302b. The selection of the sponsor group(s) is based upon the location of the subscriber station 32. This process results in the selection of a corresponding group of sponsor(s) from the groups 1 thru N. For example, if there exists ten predefined sponsor groups 1 through 10, then the location of origination for a call from the subscriber station 32 will be used to identify or select one or more of these groups (i.e., certain groups will be identified with, or correspond to, a particular cell).

Steps 304b, 306b and 308b of the process 300b are similar to the steps 304a, 306a and 308a of the process 300a.

Figure 4:
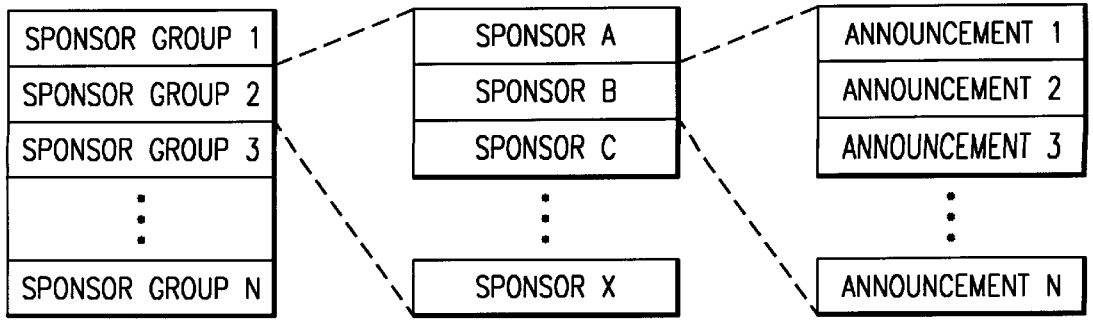
FIG. 4 is a hierarchy/organization of sponsor groups, sponsors and announcements.

Now referring to FIG. 4, there is illustrated the hierarchy/organization of the sponsor groups, sponsors and announcements of the present invention. Each sponsor group (1 through N) includes one or more sponsors (A through X). Each sponsor has associated with it one or more announcements (1 through N). For illustrative purposes only, there is shown in FIG. 4 a set of sponsor groups (1 through N), the set of sponsors (A through X) contained within the sponsor group 2, and a set of announcements (1 through N) associated with the sponsor B.

The method and apparatus described herein can be implemented in any telecommunications standards and/or software languages, and has been implemented by the inventors for GSM using CAMEL standards.

Although the present invention and its advantages have been described in the foregoing detailed description and illustrated in the accompanying drawings, it will be understood by those skilled in the art that the invention is not limited to the embodiment(s) disclosed but is capable of numerous rearrangementsn, substitutions and modifications without departing from the spirit and scope of the invention as defined by the appended claims.

What is claimed is:

1. A method for selecting and transmitting a message to a user in a telecommunications system, comprising the steps of:

receiving a call from a subscriber station, the call comprising call origination information;

comparing the call origination information to triggering criteria and triggering if the call origination information meets the triggering criteria, the call origination information including station identification data uniquely identifying the subscriber station;

selecting a message based on one or more attributes of the subscriber station in response to the triggering, the step of selecting the message based on one or more attributes of the subscriber station in response to the triggering comprising the steps of:

retrieving profile information associated with the subscriber station using the station identification data; and selecting the message based on the retrieved profile information, the step of selecting the message based on the retrieval profile information comprising the steps of:

selecting a first sponsor group of a list of sponsor groups;

selecting a first sponsor from a list of sponsors in the first sponsor group; and selecting the message from a list of messages associated with the first sponsor; and transmitting the selected message to be received by the subscriber station.

2. The method in accordance with claim 1 further comprising the steps of:

transmitting a prompt to the subscriber station;

receiving a predetermined prompt response from the subscriber station in response to the prompt; and transmitting the selected message after the predetermined prompt response is received.

3. The method in accordance with claim 1 wherein the call origination information includes station identification data uniquely identifying the subscriber station, and wherein the step of comparing and triggering comprises the steps of comparing the identification data to a database comprising a plurality of predetermined identification numbers and triggering if the station identification data of the subscriber station is equal to a one of the plurality of predetermined identification numbers within the database.

4. The method in accordance with claim 1 wherein the call origination information includes called number data, and wherein the step of comparing and triggering comprises the steps of comparing the called number data to a database comprising a plurality of predetermined called numbers and triggering if the called number data of the subscriber station is equal to a one of the plurality of predetermined called numbers within the database.

5. The method in accordance with claim 1 wherein the call origination information includes destination information, and the method further includes the step of routing the call to a destination defined by the destination information after the selected message is transmitted.

6. The method in accordance with claim 1 wherein the selected message is an audible announcement.

7. The method in accordance with claim 1 wherein the one or more attributes includes location data that identifies the location of the subscriber station and the selected message is selected based on the location of the subscriber station.

8. The method in accordance with claim 7 further comprising the step of generating the location data based on the location of the subscriber station.

9. The method in accordance with claim 1 wherein the message is selected base on a plurality of attributes associated with the subscriber station using a selection process.

10. The method in accordance with claim 1 wherein the call origination information includes station identification data uniquely identifying the subscriber station, and the step of selecting the message comprises the steps of:

retrieving profile information associated with the subscriber station using the station identification data; and selecting a message based on the retrieved profile information and on the location of the subscriber station.

11. A method for selecting and playing an announcement to a subscriber station in response to a call origination received from the subscriber station in a telecommunications system, comprising the steps of:

selecting an announcement based on at least one attribute of the subscriber station in response to the triggering, the step of selecting an announcement comprising the steps of:

retrieving profile information associated with the subscriber station using a station identification of the subscriber station; and selecting the announcement based on the retrieved profile information, the step of selecting the announcement based on the retrieved profile information comprising the steps of:

selecting a first sponsor group of a list of sponsor groups;

selecting a first sponsor from a list of sponsors in the first sponsor group; and selecting the announcement from a list of announcements associated with the first sponsor;

establishing a communications link with the subscriber station; prompting the subscriber station for a predetermined response; waiting for a predetermined response from the subscriber station; receiving the predetermined response; and playing the selected announcement to the subscriber station after the predetermined response is received from the subscriber station.

12. The method in accordance with claim 11 further comprising the step of providing a communications link between the subscriber station and a predetermined destination after playing the selected announcement.

13. The method in accordance with claim 11 wherein one of the attributes is the location of the subscriber station.

14. The method in accordance with claim 11 wherein the selection of the announcement is also based on the location of the subscriber station.

15. A method for selecting and playing an announcement to a user in a telecommunications system, comprising steps of:

receiving a call from a subscriber station, the call comprising call origination information;

comparing the call origination information to triggering criteria and triggering if the call origination information meets the triggering criteria;

selecting an announcement based on at least one attribute of the subscriber station in response to the triggering, the step of selecting an announcement comprising the steps of:

retrieving profile information associated with the subscriber station using a station identification of the subscriber station; and selecting the announcement based on the retrieved profile information, the step of selecting an announcement based on the retrieved profile comprising the steps of:

selecting a first sponsor group of a list of sponsor groups; selecting a first sponsor from a list of sponsors in the first sponsor group; and selecting the announcement from a list of announcements associated with the first sponsor;

establishing a communications link with the subscriber station; prompting the subscriber station for a predetermined response; waiting for a predetermined response from the subscriber station; receiving the predetermined response; and playing the selected announcement to the subscriber station after the predetermined response is received from the subscriber station.

16. The method in accordance with claim 15 further comprising the step of routing the call to a predetermined destination after playing the selected announcement.

17. The method in accordance with claim 15 wherein the call origination information includes station identification data uniquely identifying the subscriber station, and wherein the step of comparing and triggering comprises the steps of comparing the identification data to a database comprising a plurality of predetermined identification numbers and triggering if the station identification data of the subscriber station is equal to a one of the plurality of predetermined identification numbers within the database.

18. The method in accordance with claim 15 wherein the call origination information includes called number data, and wherein the step of comparing and triggering comprises the steps of comparing the called number data to a database comprising a plurality of predetermined called numbers and triggering if the called number data of the subscriber station is equal to a one of the plurality of predetermined called numbers within the database.

19. The method in accordance with claim 15 wherein one of the attributes is the location of the subscriber station.

* * * * *